March 7, 1933. H. E. ALTGELT ET AL 1,900,269
HARVESTER
Filed May 21, 1930 2 Sheets-Sheet 2
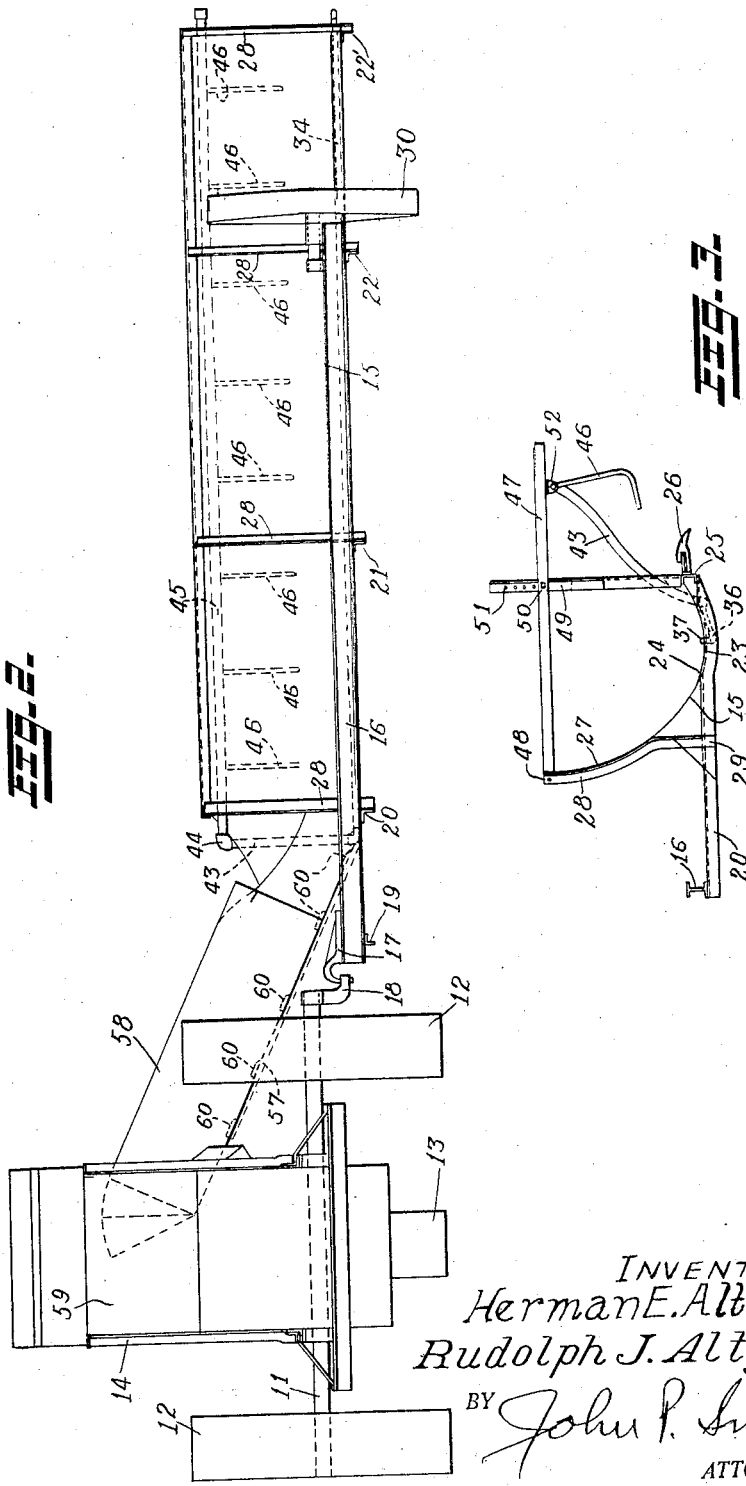

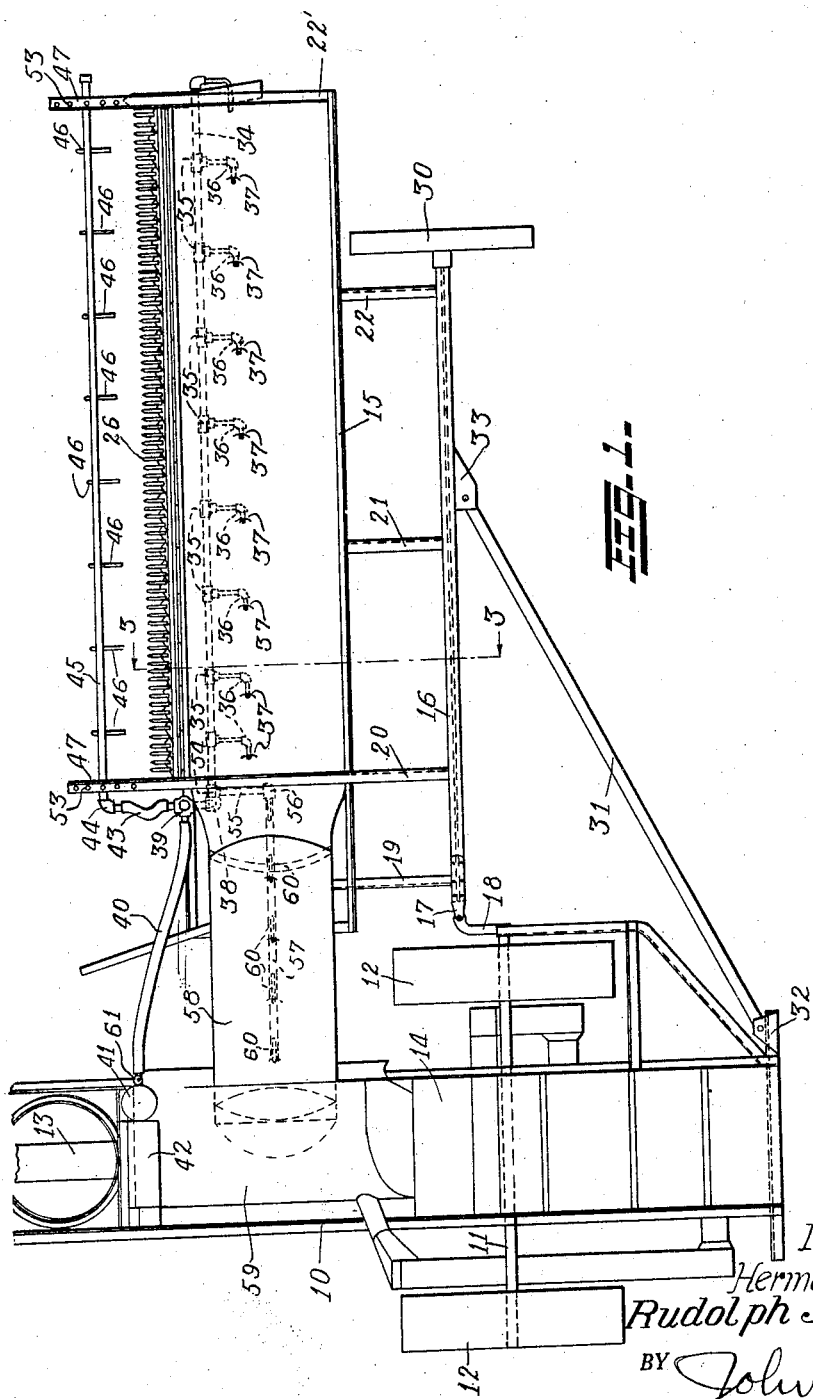

Patented Mar. 7, 1933

1,900,269

UNITED STATES PATENT OFFICE

HERMAN E. ALTGELT AND RUDOLPH J. ALTGELT, OF SOUTH BEND, INDIANA, ASSIGNORS TO OLIVER FARM EQUIPMENT COMPANY, A CORPORATION OF DELAWARE

HARVESTER

Application filed May 21, 1930. Serial No. 454,219.

The present invention relates generally to harvesters and more particularly to a novel and improved means for conveying and elevating the grain from a point adjacent the severing mechanism (such as a cutting mechanism or stripping mechanism as the case may be) into the harvester proper.

One of the objects of the present invention is to provide a novel and improved form of conveying and elevating mechanism for grain harvesters which eliminates all of the operative or movable parts heretofore used to accomplish this function.

A further object of the invention is to provide a novel and improved conveying and elevating mechanism for grain harvesters in which spaced apart pneumatic means is arranged adjacent the severing mechanism so as to form in effect, a floating conveyor for the grain to be conveyed and elevated to the harvester proper.

A still further object of the invention is to provide in combination with our improved conveying and elevating mechanism, a novel and improved form of adjustable pneumatic means to deflect or direct the grain rearwardly with respect to the severing mechanisms of the harvester so that the same may be substituted in lieu of the conventional form of revolving reel heretofore used on harvesters for that purpose.

These and other objects are accomplished by providing a construction and an arrangement of the various parts in the manner hereinafter described and particularly pointed out in the appended claims.

Referring to the drawings:

Fig. 1 is a top plan view of a conventional form of a combine harvester and thresher showing one embodiment of our improved gathering, conveying and elevating mechanism mounted therein;

Fig. 2 is a rear elevational view of the same; and

Fig. 3 is a cross sectional view taken on the line 3—3 in Fig. 1.

In illustrating one form of our invention, we have shown the same in connection with a combine harvester and thresher, but it will of course be understood that the invention is capable of use in connection with other forms of harvesters.

The terms "severing means" and "severing mechanism" used throughout the specification and claims is to be construed in its broadest sense so as to include a cutting mechanism or sickle and a stripping mechanism such as is commonly used with machines of this type.

The conventional form of combine harvester and thresher disclosed in the drawings comprises the usual main frame 10 which is mounted on the usual main axle 11 which in turn is supported on the usual main supporting wheel 12. The front end of the main frame 10 is provided with a conventional form of steering wheel 13. Mounted on the main frame 10 is the usual threshing cylinder and separating mechanism located within a housing which is generally indicated by the reference character 14. Detachably connected with and extending grainwardly with respect to the main frame of the harvester, is a transversely extending grain trough generally indicated by the reference character 15. This conveyor trough is mounted on a supplemental frame attached to the main frame and comprises a transversely extending I-beam 16 which has its inner end provided with hook bracket 17. The hook bracket 17 is adapted to engage an eye bracket 18 secured to one of the main frame members 10 of the harvester. Secured to the underside of the I-beam 16 and extending forwardly therefrom in a longitudinal direction are five angle members 19, 20, 21, 22 and 22'. The angle members 20, 21, 22 and 22' have their forward ends slightly depressed as shown at 23, (see Fig. 3) for the purpose of forming a seat for a curved trough 24. Secured to the foremost ends of the longitudinal members 19, 20, 21, 22 and 22' is a U bar 25 which forms the support for a severing mechanism (such as a cutting or stripping mechanism) generally indicated by the reference character 26. The cutting mechanism is of a conventional construction and is operatively driven by the traction wheels of the harvester or from a source of power which may be derived from a separate engine or power take-off from a tractor which may also be the draft power for pulling the harvester, all of which may be done in a manner well understood in the art. The grain trough 24 is curved upwardly and rearwardly as shown at 27 to a point a substantial distance above its lowest point so as to form in effect a shield to prevent the grain from passing over the top thereof. The upper curved portion of this trough is supported in position by angle braces 28 which have their lower ends secured as shown at 29 to the longitudinally extending frame members 20, 21, 22 and 22′ respectively. The outer or grainward ends of the trough is supported by a grain wheel 30 which in turn is journaled on the outer end of the I beam 16 in any well known manner. The grain trough 15 and frame which supports the same is braced rigidly with respect to the main frame 10 of the harvester by a diagonal brace bar 31 which has its rear end detachably fastened to a bracket 32 secured to the main frame 10 and its forward end detachably fastened to a bracket 33 secured to the I beam 16.

The primary feature of present invention involves a pneumatic means for deflecting, guiding, conveying and elevating grain in combination with the severing means, such for example as a cutting or stripping mechanism of a harvester, whereby the conventional form of revolving reel and endless belt type of conveyor heretofore used, are dispensed with, so that all moving parts, heretofore required for accomplishing this primary harvesting function in connection with a grain harvester, is entirely eliminated.

In carrying out this important feature of our invention, we have shown the same in connection with a transversely extending air pressure conduit or pipe 34 which is positioned beneath and secured to the trough 24 in any well known manner. Connected by means of T fittings at spaced apart distances throughout the length of the pipe 34 are a plurality of elbows 36; the free end of which protrudes through the slits as indicated at 37 in the lowermost or curved portion of the trough 34. Each of these elbows 36 direct a current of air in a direction of the harvester proper, so as to form in effect, a floating conveyor for the grain as it is discharged into the trough. The stubbleward end of the pipe 34 is connected by means of an elbow 38 to a T fitting 39 which in turn has one of its ends connected by a flexible tube 40 to an air storage tank 41. The air storage tank 41 is connected to an air compressor 42 of any conventional construction which in turn is operatively driven by a motor on the harvester, or from the source of power of the tractor which usually forms the draft power for the harvester. The other end of the T fitting 39 is connected by means of a flexible tube 43 to an elbow 44 which in turn is connected to a transversely extending air pressure pipe or conduit 45. The pipe 45 is provided with a plurality of downwardly and rearwardly extending curved tubes 46 for discharging the air rearwardly for the purpose of guiding and deflecting the grain as it passes over the severing means 26. The pipe 45 is adjustably supported on horizontally extending arms 47 located on the opposite ends of the trough 44. The arms 47 are pivoted as shown at 48 to the outer standards 28 and their forward ends are adjustably supported by vertical standards 49 by means of adjustably securing the bolts 50 in the various apertures 51 in the vertical standard 49. The pipe 45 may be adjusted forwardly or rearwardly with respect to the severing mechanism 26 by means of adjusting supporting brackets 52 in the various apertures 53 provided in the forwardly extending arms 47. This construction permits the air pressure 46 to be adjustable vertically, forwardly and rearwardly with respect to the severing mechanism for the purpose of taking care of the different conditions which are found in the grain field. This blast of rearward directed air serves the purpose of deflecting the grain rearwardly and performs substantially the same function as the conventional form of revolving reel heretofore used.

Connected to the pipe or conduit 34 at the stubbleward end thereof, by means of a T fitting 54, an extension 55 and elbow 56 is an upwardly inclined air pressure conduit or pipe 57. This conduit 57 is located below and secured to an upwardly inclined extension or elevator trough 58 which is connected to and preferably though not necessarily, narrower than the main trough 24. The discharge end of the elevator trough 58 extends into a shielded housing 59 and discharges the grain onto a conveyor, not shown, which delivers it to the threshing cylinder and separating mechanism within the housing 14. The pipe or conduit 57 is provided with a plurality of spaced-apart elbows as shown at 60 which are located throughout the entire length of the inclined elevator trough 58 for discharging air under pressure in a direction toward the harvester proper and forming in effect a floating conveyor for the grain received from the main trough 24. A suitable valve as shown at 61 may be positioned adjacent the air storage tank 41 for controlling passage of air therethrough. Also, a valve may be postioned in the T fitting 39 for regulating the pressure passing through the various conduits.

It will be obvious from the above description that as the harvester is moved through the grain field, the grain will be severed by the severing mechanism 26 and deflected rearwardly by the blast of air coming through the tubes 46 and discharged onto the trough 24. As the grain strikes the trough 24, the blast of air coming through the spaced apart elbows 37 will form in effect a floating conveyor and convey the grain toward the incline trough 58 from where it will be elevated by the blast of air from the spaced apart elbows 60 and discharged into the harvester proper.

The pneumatic construction used in combination with the severing means dispenses with all the movable parts, heretofore used in connection with gathering, conveying and elevating grain to a harvester proper, i. e., it eliminates the necessity of a revolving reel and the endless conveyor heretofore used.

While in the above specification we have described one embodiment which our invention may assume in practice, it will of course be understood that the same is capable of modification and modification may be made without departing from the spirit and scope of the invention as expressed in the following claims.

What we claim as our invention and desire to secure by Letters Patent is:

1. The combination with a harvester, of grain severing means located on one side of said harvester, a conveying trough located rearwardly of said severing means, and pneumatic means located in said trough for conveying the grain laterally in said trough to the harvester proper.

2. The combination with a harvester having grain severing means associated therewith, a trough arranged parallel to said severing means and pneumatic means located parallel to and in transverse alignment with said severing means for conveying the grain in said trough away from said severing means.

3. The combination with a harvester having grain severing means associated therewith and extending transversely with respect thereto, and pneumatic conveying and elevating means arranged in parallel relation with said severing means for conveying the grain in one direction laterally with respect to said severing means.

4. The combination with a harvester, of a frame therefor, a grainwardly extending trough secured to said frame, grain severing mechanism located on the forward edge of said trough and pneumatic means in said trough for conveying and elevating the grain severed by said severing means.

5. The combination with a harvester, of grain severing means associated therewith, a trough arranged parallel to said severing means pneumatic means supported by said harvester in advance of said severing means for deflecting the grain over said severing means into said trough and pneumatic means for conveying the grain along said trough.

6. The combination with a harvester, of grain severing means associated therewith, a trough arranged parallel to said severing means adjustable pneumatic means supported by said harvester in advance of said severing means for deflecting the grain over said severing means and into said trough and pneumatic means for conveying the grain along said trough.

7. The combination with a harvester, of grain severing means therefor, a trough positioned rearwardly of said severing means, and means for supplying blasts of air along said trough for conveying the grain laterally with respect to said severing means.

8. The combination with a harvester, of severing means therefor, a trough positioned rearwardly of said severing means and extending transversely with respect to said harvester, and spaced apart tubes located in said trough for supplying blasts of air for conveying the grain laterally in said trough.

9. The combination with a harvester, of grain severing means associated therewith and extending transversely with respect thereto, a trough located rearwardly of said severing means, an upwardly inclined extension of said trough, and pneumatic means located in said trough and said extension for conveying and elevating the grain severed by said severing mechanism.

10. The combination with a harvester, of a frame therefor, a grainwardly extending trough secured to said frame, a grain severing means located on the forward edge of said trough, an upwardly inclined extension connected to one end of said trough, a pneumatic means connected to a single source of air pressure for guiding, conveying and elevating the grain into said harvester.

11. The combination with a harvester, of a frame therefor, a grainwardly extending trough secured to said frame, an upwardly inclined extension secured to said trough, an air pressure conduit extending beneath said trough and beneath said extension and a plurality of spaced apart air pressure spouts extending through said trough and said extension and communicating with said air pressure conduit for conveying and elevating the grain from said severing mechanism into said harvester.

12. The combination with a harvester, of grain severing mechanism associated therewith, a curved trough located rearwardly of said grain severing mechanism, and a plurality of air pressure spouts extending into said trough at the lower point thereof for conveying the grain laterally with respect to said grain severing mechanism.

13. The combination with a harvester, of grain severing mechanism associated therewith, a curved trough positioned rearwardly of said grain severing mechanism, said trough having a rearwardly and upwardly extending portion to form a shield therefor, and a plurality of spaced apart pneumatic spouts extending through said trough at the lowest point thereof for conveying the grain laterally with respect to said grain severing mechanism.

14. The combination with a harvester, of grain severing means associated therewith, and pneumatic means derived from a single source of air pressure for guiding, conveying and elevating the grain into said harvester.

15. The combination with a harvester, of grain severing means associated therewith, a grain trough positioned rearwardly of said severing means, an upwardly inclined extension connected to one side of said trough for delivering grain to the harvester proper, an air pressure conduit located below and secured to said trough and extension, and a plurality of spouts connected with said conduit and arranged at spaced apart intervals along said trough and extension for conveying and elevating the grain severed by said severing means.

16. The combination with a harvester, of grain severing means associated therewith, a grain trough positioned rearwardly of said severing means, an upwardly inclined extension connected to one side of said trough for delivering grain to the harvester proper, an air pressure conduit located below and secured to said trough and extension, a plurality of spouts connected with said conduit and arranged at spaced apart intervals along said trough and extension for conveying and elevating the grain severed by said severing means, and pneumatic means positioned over said severing means for deflecting the grain thereover.

In testimony whereof we have signed our names to this specification, on this 16th day of May, A. D. 1930.

RUDOLPH J. ALTGELT.
HERMAN E. ALTGELT.